United States Patent

[11] 3,571,726

[72] Inventor Elmer L. Henderson
Philadelphia, Pa.
[21] Appl. No. 704,740
[22] Filed Feb. 12, 1968
[45] Patented Mar. 23, 1971
[73] Assignee The United States of America as represented by the Secretary of the Air Force

[54] HIGH SPEED DOUBLE RANK SHIFT RIGISTER

8 Claims, 3 Drawing Figs.

[52] U.S. Cl. .......... 328/37, 307/221
[51] Int. Cl. .......... G11c 19/00
[50] Field of Search .......... 328/37; 307/221

[56] References Cited

UNITED STATES PATENTS 3,185,864 5/1965 Amodei et al. .......... 328/37X
3,297,950 1/1967 Lee .......... 328/37

*Primary Examiner*—John S. Heyman
*Attorneys*—Harry A. Herbert, Jr. and George Fine ABSTRACT: A double rank shift register having a coupling stage on the input side periodically pulsed by a control signal to enable or inhibit the first register element to accept input data. The control signal to the coupling stage of the second register element is 180° out of phase with control signal to the first register element to enable or inhibit the second register element. Since the coupling stages used between the register elements are identical, the phase of the control signal determines whether the coupling stage is enabled or inhibited.

INVENTOR.
ELMER L. HENDERSON
BY Harry A. Herbert Jr
and George Fine
ATTORNEYS

HIGH SPEED DOUBLE RANK SHIFT RIGISTER

BACKGROUND OF THE INVENTION

The present invention relates to improvements in a shift register of the type consisting of a series of interconnected bistable elements. The state of the bistable element depends upon the input data which is shifted in during an enabled period. These bistable elements are used for information storage and function in conjunction with gates for information transfer. Generally, there are two gates for every bistable element, one gate controls the input to the bistable element while the other gate controls the output. The bistable element itself may be two gates that are cross-connected in a flip-flop configuration. Thus, the elements of a single shift register stage may consist of four gates connected in the proper configuration. Each gate requires a finite amount of time for an input signal to pass through the gates to the output. This time interval is commonly referred to as propagation delay and it limits the operating frequency of the shift register.

Generally, in prior forms of shift registers, a single register stage could comprise as many as six gates in series and as few as three gates. Each gate contributes a propagation delay which establishes the time required for the operation of the shift register. Thus, it can be seen that the operating frequency of a shift register stage is inversely proportional to the number of gates times the average propagation delay. It may be observed that the highest possible operating frequency for prior shift registers would be $f= 1/3D$, where $f$ represents frequency in megahertz, D is the propagation delay of the gates used, and the number 3 represents the number of gates used in a shift register stage (in this case, 3, since we assume the smallest number to achieve the maximum frequency.

The need for highest speed shift registers arises from the demand on computing equipment for faster processing of digital information. Historically and currently, the speed of processing and of performing arithmetic operations in the computer depends for the most part on the access time of storage in the computer. This includes access time to registers, buffers, and the main memory. Advances in the computer field have been retarded because of the dependence upon prior computer art which is compatible for use with the newer high-speed equipment but does not have the necessary speed in order to have an overall faster computer. The shift registers which are currently in use are limited in operating frequency as shown by the formula $f=1/3D$. The present invention provides a substantial improvement in operating frequency by having a maximum operating frequency of $f=1/2D$. Thus, a two-to-one speed advantage may be realized over the conventional arrangement of shift register.

SUMMARY OF THE INVENTION

This invention provides a shift register to receive and store digital information in individual bits in a series of electronic storage circuits. In order to store a digital word in the shift register, the information must be shifted bit by bit into the temporary storage element and then to the register element. The initial storage and subsequent transfer of the digital information are mutually exclusive. The first bit of a digital word, once it is stored in the temporary storage element, must be shifted to the register element before the second bit is received in the storage element. The transfer of the first bit from the storage element to the register element is achieved upon receipt of a control signal which establishes a master-slave relationship between the storage and register elements. The control signal alternately establishes a master-slave relationship first between the storage and the register element and then between the register and storage element. Therefore, during the interval that the storage and register element are in a master-slave relationship, the input to the storage element is disabled so that it cannot receive a new bit of information during the time the storage element is transferring its information to the register element. Since the shift register consists of a series of alternate stages of storage and register elements that are enabled or disabled by the control signal, the digital information is alternately shifted from the input storage element to the output register element until it is stored in the entire register. By a unique and effective arrangement of the control circuitry between the storage and register element, a control signal comprising two square waves 180° out of phase may be utilized to alternately enable and disable the shift register and thereby transfer information into the register.

It is an object of this invention to provide a shift register having greater speed of operation than is presently obtainable.

It is a further object of this invention to provide control circuitry between the shift register elements which does not contribute a propagation delay to the operation of the shift register.

It is still another object of this invention to provide a shift register having a maximum operating frequency that is defined by the formula $f=1/2D$, where $f$ is the maximum operating frequency in megahertz and D is the propagation delay of the logic gate in microseconds.

These and other features and objects of this invention will become apparent from the following description and claims when read in view of the drawings.

BRIEF DESCRIPTION OF THE DRAWINGS

Referring to FIG. 1 of the drawing, there is shown a circuit diagram, partly schematic, of the high-speed storage element, which is the basic building block of the high-speed shift register. Logic gate 27 which is the basic logic element of the high-speed shift register is preferably of the current steering logic gate circuit configuration which is shown in FIG. 9—53 on page 359 of "Pulse, digital and switching waveforms," written by Millman and Taub and published by McGraw-Hill Book Company, Inc., in 1965. Presently, current steering logic gates provide the highest obtainable speeds of operation. This mode of operation eliminates minority carrier storage time and thus provides an associated increase in the switching speed of the logic gate.

The bistable element that is required for the storage of input data is a set-reset flip-flop which is comprised of logic gate 27 with a direct connection 50 from its output 30 to one of its inputs 26. It should be noted that the bistable element is a unique flip-flop arrangement using a single current steering logic gate. For the purposes of the present description, the bistable element has a direct connection between one of its inputs and one of its outputs, but by an appropriate adjustment of circuit component values, a bistable element can be formed having substantially the same operation by utilizing a resistor in place of the direct connection 50.

Figure 1:
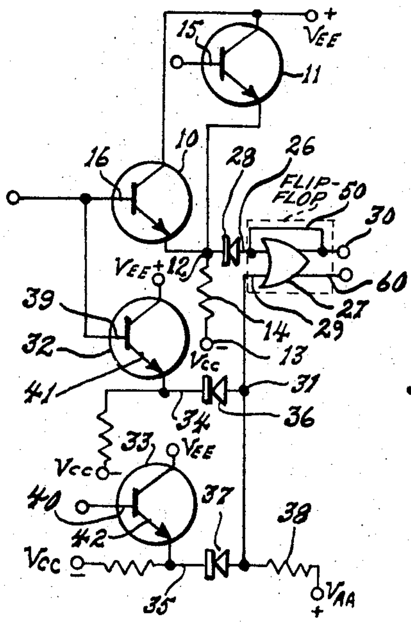
FIG. 1 is a circuit diagram, partly schematic, of the high speed storage element of the present invention.

Turning now to the description of the high-speed element, transistors 10 and 11 have a common emitter node 12, and are returned to the supply voltage 13 through resistor 14. Logic level voltages for the "one" and "zero" logic levels are 0 and −0.8 volts respectively. The logic level voltages which are used in the description of FIG. 1 are appropriate for the supply voltages used. For input signal levels of 0 and −0.8v., this configuration performs an OR function for the 0v. level. That is, the input to either base 15 or 16 at 0v. holds point 12 at approximately −0.8v. When both bases 15—16 are at −0.8, point 12 will be at −1.6v. due to the voltage divider formed by source $V_{EE}$, transistors 10 and 11, resistor 14, and source $V_{CC}$. The input 26 to gate 27 will be approximately −0.8v. higher than point 12 because of the voltage drop across diode 28. Consequently, the voltage level at the input 26 to gate 27, connected to diode 28, can be at either 0v. or at −0.8v. With both inputs 26 and 29 to gate 27 at –0.8v., the "one" output 30 will be at –0.8v. and with either input 26 or 29 to gate 27 at 0v. the "one" output 30 will be at 0v. The "zero" output 60 is not used in the present configuration.

The voltage level at both points 12 and 31 is at –0.8v., the "one" output 30 can be at either –0.8v. or 0v. and will remain in that state until a change is initiated by point 12 or 31. Transistors 32 and 33 operate as conventional emitter followers. The outputs 34, 35 of each emitter follower is coupled by diodes 36 and 37 to resistor 38. The combination of diodes 36, 37 and resistor 38 performs an OR function for low input signals. For example, assume that input level at base 39 of transistor 32 is at –0.8v. and the input level at base 40 of transistor 33 is at 0v. The voltage level at emitter 41 of transistor 32 is at approximately –1.6v. due to the voltage divider formed by source $V_{AA}$, resistor 38, diode 36, source $V_{CC}$ and its associated resistor. The voltage level at emitter 42 of transistor 33 is at –0.8v. Since voltage level at emitter 41 of transistor 32 is more negative than the level at emitter 42 of transistor 33, diode 36 conducts and point 31 is held at approximately –0.8v., a diode drop more positive than the voltage level at the emitter 41 of transistor 32. If the input conditions are interchanged, the voltage level at point 31 would still be at 0.8v. With both inputs to bases 39, 40 at 0v., point 31 will be 0v. Under this condition, both diodes 36 and 37 are conducting.

Consider the operation of the circuit as storage element of a shift register. Assume that the "one" output 30 of the stage is at –0.8v. The input levels to bases 16, 39 of transistors 10 and 32 respectively are at 0v., and the input levels to bases 15, 40 of transistors 11 and 33 respectively, change abruptly. The input level at base 40 changes from –0.8v. and simultaneously input level at base 40 changes from –0.8v. to 0v. It was pointed out previously that 0v. at the input to either transistor 10 or 11 would hold point 12 at –0.8v. and also that –0.8v. at the input to either transistor 32 and 33 would hold point 31 at –0.8v. These conditions existed prior to the abrupt changes in input levels at bases 15 and 40. These conditions also permit the storage element to remain locked in either of its two states. The change in input level at base 15 will have no effect at point 12 as long as the base 16 of transistor 10 remains at 0v. The change in input level at base 40 forces point 31 to 0v. The change in input level at base 15 will have not effect at point 12 as long as the base 16 of transistor 10 remains at 0v. The change in input level at base 40 forces point 31 to 0v. Zero volts at the input 29 to gate 27 puts the "one" output 30 at 0v. Now with the bases 16, 39 of transistors 10, 32, respectively, biased at –0.8v. and then the input level at base 15 changing abruptly from 0v. to –0.8v. and the input level at base 40 changing abruptly from –0.8v. to 0v., the voltage at the base 39 of transistor 32 inhibits the point 31 at –0.8v. However, the voltage level at point 12 falls rapidly to –1.6v. and the voltage level at input 26 to gate 27 falls to –0.8v., then "one" output 30 follows. From the action described, it is obvious that if the inputs at bases 15 and 40 are always 180° out of phase with each other, there is but one condition which will permit a change in the storage element; specifically, input level at base 15 at –0.8v. and input level at base 40 at 0v. Also, it has been show that only a single input line to transistors 10 and 32 is required to properly condition the acceptance of the input data to the shift register element.

Figure 2:
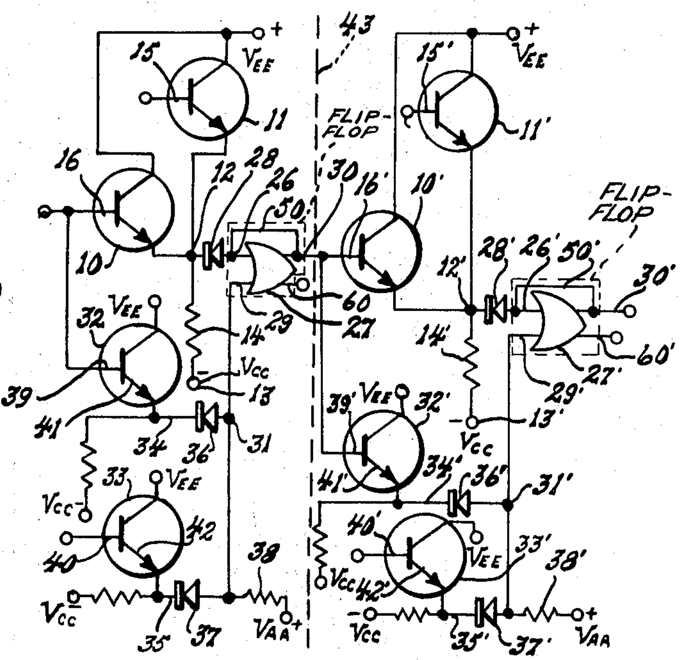
FIG. 2 is a circuit diagram of a double rank shift register stage of the present invention utilizing a pair of high-speed storage elements as shown in FIG. 1.
Figure 3:
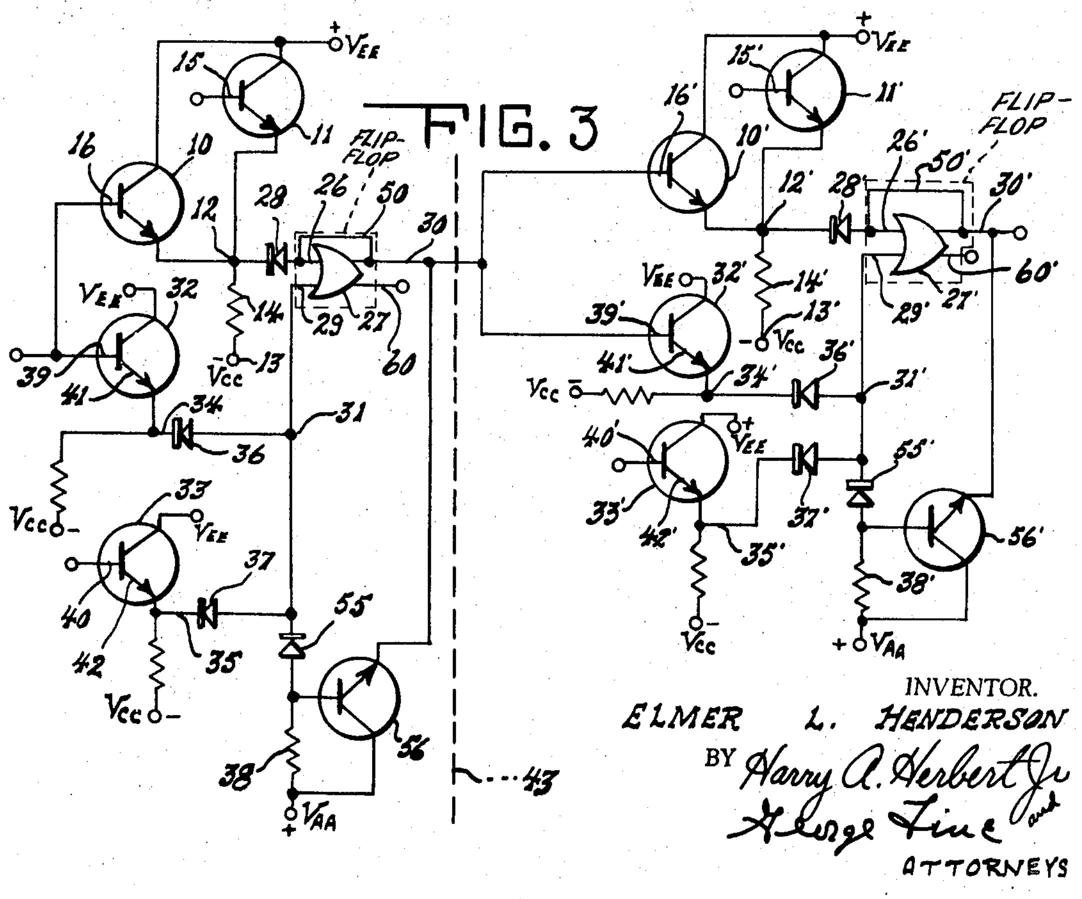
FIG. 3 is a circuit diagram of the double rank shift register stage shown in FIG. 2 but in modified form.

In FIG. 2, a double rank shift register stage is shown basically, by connecting two of the circuits of FIG. 1 in tandem. The operation of the two shift register elements which are divided by the dashed line 43 for clarity is as was described for the circuit in FIG. 1. The numbered items of the second circuit have a prime designation to indicate its correspondence to the identical-numbered item of the first circuit. The only difference between the two circuits is the application, at corresponding points in the two circuits, of input control signals which are 180° out of phase with each other. The input control signal which is applied at the base 15 of transistor 11 is 180° out of phase with the input control signal applied at the base 15′ of transistor 11′. The input signal which is applied at the base 40 of transistor 33 is 180° out of phase with the input control signal applied at base 40′ of transistor 33′. It can be noted that these points are identical circuit points of their respective shift register element. Therefore, each stage will store information in alternate control signal periods. When the logic gates 27, 27′ do not have a low impedance emitter follower output, the rise time tends to be slow because of the RC time constant of the logic gate output resistor and wiring capacity. Normally this transition would be very fast. The "one" output in this configuration goes high, slower due to the propagation delay from point 31 through gate 27. This tends to make the "ones" and "zeros" unequal for equally spaced clock pulses. An addition to the circuit of FIG. 2 is shown in FIG. 3 which overcomes these problems.

An emitter follower type output for the logic gates 27, 27′ is provided by adding diodes 55, 55′ and transistors 56, 56′ to FIG. 2. Thus, a high-speed shift register element is provided with an output signal having equal "ones" and "zeros" and rapid rise times because the input control signal is coupled directly to the "one" output. The circuit of FIG. 3 is a complete double rank shift register stage.

The description and drawings herein contained are merely illustrative and various modifications and changes will occur to those skilled in the art without departing from the spirit of the invention. Therefore, we intend to be limited only by the true scope of the invention and of the appended claims.

I claim:

1. A shift register comprising a bistable storage element, a bistable register element, a first shift control means, a second shift control means, and a shift control signal operatively connected with each of said shift control means for enabling-inhibiting said first and second shift control means in a mutually exclusive operating state, said first shift control means being connected to said storage element for initially transferring the state of the input signal to the storage element, said second shift control means being connected in series with said storage element and said register element for subsequently transferring the state of the storage element to the register element; said shift control signal comprising two substantially similar waveforms having the dual functions of initially enabling the first shift control means to transfer input signal state to the storage element while disabling the second shift control means to prevent the transfer of the storage element state to the register element and secondly disabling the first shift control means preventing the input signal stage from entering the storage element while the second shift control means is enabled thereby maintaining a master-slave relationship between the storage element and the register element, thus transferring the state of the storage element to the register element.

2. In a shift register for receiving data from an input source signal:

a. a bistable storage element,
b. a bistable register element,
c. a shift control input signal comprising a pair of simultaneously presented waveforms,
d. a first shift control means having first and second shift control signal input terminals, each receiving the waveform of said shift control input signal, and a data input terminal connected with said input source, the output of said first shift control means being directed to said bistable storage element, and including means for establishing a master-slave relationship between said input source and said bistable storage element on the receipt of the enable level of said shift control input signal waveforms at said first and second shift control signal input terminals and for interrupting said relationship on the receipt of the inhibit level of said shift control input signal waveforms, and
e. a second shift control means having a first and second shift control signal input terminals connected to receive the shift control signal waveforms, and a data input terminal connected to said bistable storage element, said second shift control means connected in series with said bistable storage element and said bistable register element and including means for establishing a master-slave relationship to transfer the state of said bistable storage element to said bistable register element on the receipt of the enable level of said shift control input signal waveforms at said first and second shift control signal input terminals and for interrupting said relationship on the receipt of the inhibit level of said shift control input signal waveforms.

3. A shift register according to claim 2 where said first and second shift control means provide first and second shift control signals respectively, of substantially the same frequency and amplitude but 180° out of phase with respect to each other.

4. A shift register according to claim 3 wherein said first and second shift control means each receive at their first and second shift control signal inputs respectively a pair of square-wave waveforms of substantially the same frequency and amplitude but 180° out of phase with respect to each other and each pair of square-wave waveforms being 180° out of phase with respect to each other.

5. A shift register according to claim 2 wherein said bistable storage element comprises a single logic gate with a resistive circuit coupled from one of its inputs to the output.

6. A shift register according to claim 2 wherein said bistable storage element comprises a single logic gate with a connecting circuit coupled form one of its inputs to the output.

7. A shift register according to claim 2 wherein said bistable register element comprises a single logic gate with a resistive circuit coupled from one of its inputs to the output.

8. A shift register according to claim 2 wherein said bistable register element comprises a single logic gate with a connecting circuit coupled from one of its inputs to the output.